(12) United States Patent
Iyer et al.

(10) Patent No.: US 12,430,233 B2
(45) Date of Patent: Sep. 30, 2025

(54) METHOD AND SYSTEM FOR PERFORMANCE MANAGEMENT OF DISTRIBUTED SOFTWARE APPLICATIONS

(71) Applicant: Tata Consultancy Services Limited, Mumbai (IN)

(72) Inventors: Harish Sivasubramanian Iyer, Pune (IN); Arunava Bag, London (GB); Jayanti Venkata Sai Narayana Murty, Santa Clara, CA (US)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 448 days.

(21) Appl. No.: 17/818,122

(22) Filed: Aug. 8, 2022

(65) Prior Publication Data
US 2023/0078091 A1 Mar. 16, 2023

(30) Foreign Application Priority Data
Aug. 14, 2021 (IN) .............................. 202121036874

(51) Int. Cl.
*G06F 11/3668* (2025.01)
*G06F 11/34* (2006.01)

(52) U.S. Cl.
CPC ...... *G06F 11/3688* (2013.01); *G06F 11/3414* (2013.01); *G06F 11/3684* (2013.01)

(58) Field of Classification Search
CPC ...................................................... G06F 11/34
See application file for complete search history.

(56) References Cited

U.S. PATENT DOCUMENTS

| | | | |
|---|---|---|---|
| 8,464,224 B2 | 6/2013 | Dulip et al. | |
| 8,930,918 B2 | 1/2015 | Tendulkar | |
| 9,762,461 B2 | 9/2017 | Raghunathan et al. | |
| 10,257,275 B1 * | 4/2019 | Dirac | H04L 67/1097 |
| 2014/0047272 A1 * | 2/2014 | Breternitz | G06F 11/3414 |
| | | | 714/E11.177 |
| 2015/0193328 A1 * | 7/2015 | Deakin | G06F 11/362 |
| | | | 714/38.1 |

* cited by examiner

*Primary Examiner* — Duy Khuong T Nguyen
(74) *Attorney, Agent, or Firm* — Finnegan, Henderson, Farabow, Garrett & Dunner, LLP (57) ABSTRACT

Application performance tuning and benchmarking is performed to ensure that performance of an application being monitored is matching a target performance level. State of the art systems fail to consider various dynamic performance characteristic of the application. The disclosure herein generally relates to software performance management, and, more particularly, to a method and system for performance management of distributed software applications. The system determines a context (which captures static and dynamic characteristics of the application) of the application, and based on the context the application is subject to various load conditions to measure performance. Further, tuning is done if the measured performance is not matching the target performance, to improve the performance of the application.

16 Claims, 7 Drawing Sheets

METHOD AND SYSTEM FOR PERFORMANCE MANAGEMENT OF DISTRIBUTED SOFTWARE APPLICATIONS

PRIORITY CLAIM

This U.S. patent application claims priority under 35 U.S.C. § 119 to: Indian Patent Application No. 202121036874, filed on Aug. 14, 2021. The entire contents of the aforementioned application are incorporated herein by reference.

TECHNICAL FIELD

The disclosure herein generally relates to the field of software performance management, and, more particularly, to a method and a system for performance tuning and benchmarking of distributed software applications.

BACKGROUND

Performance and scalability of distributed software applications serving critical business needs is of highest priority to ensure customer experience, business throughput and optimal cost of operation. However, for complex applications, ensuring performance scalability requires significant effort and sophisticated set of skills which are not easy to find. This most often leads to a reduced focus on these aspects, which in turn causes subsequent disruptions that are damaging to the business.

Systems for software performance assessment and monitoring are available. However, disadvantage of the existing systems is that the analysis and assessment they carry out are isolated in nature and are carried out by different stakeholders (architecture, developers, operations) and there is no available technology that intelligently integrates the steps of performance tuning and benchmarking. Furthermore, to enable this, one need a set of expensive specialist resources who work on this for extended duration of time often with a significant impact on timelines and cost.

SUMMARY

Embodiments of the present disclosure present technological improvements as solutions to one or more of the above-mentioned technical problems recognized by the inventors in conventional systems. For example, in one embodiment, a processor implemented method is provided. The method when used for tuning and benchmarking an Application Under Test (AUT), initially determines a context of the AUT by processing an input data collected for the AUT, via one or more hardware processors. Further, a plurality of test scripts are generated for the AUT, based on the determined context, via the one or more hardware processors, wherein the plurality of test scripts are used to test performance of the AUT under a plurality of load conditions. Further, a workload is generated based on each of the plurality of test scripts, of each of the plurality of load conditions, via the one or more hardware processors. Further, the generated workload for each of the plurality of load conditions is applied on the AUT, via the one or more hardware processors. Further, it is determined if a measured performance of the AUT after applying the generated workload for each of the plurality of load conditions is matching a pre-defined performance threshold, via the one or more hardware processors, wherein the performance of the AUT is measured based on collected data representing performance behaviour of the AUT. Further, for all load conditions for which the measured performance is below the performance threshold, the AUT is tuned to match the pre-defined performance with the performance threshold, via the one or more hardware processors. Tuning the AUT includes determining an optimal configuration for the one or more of the plurality of load conditions.

In another aspect, a system is provided. The system includes one or more hardware processors, an I/O interface, and a memory storing a plurality of instructions. The plurality of instructions when executed, cause the one or more hardware processors to determine a context of an application under test (AUT) by processing an input data collected for the AUT. Further, the system generates a plurality of test scripts for the AUT, based on the determined context, wherein the plurality of test scripts are used to test performance of the AUT under a plurality of load conditions. Further, the system generates a workload based on each of the plurality of test scripts, of each of the plurality of load conditions. Further, the generated workload for each of the plurality of load conditions is applied on the AUT by the system. Further, the system determines if a measured performance of the AUT after applying the generated workload of each of the plurality of load conditions is matching a pre-defined performance threshold, wherein the performance of the AUT is measured based on collected data representing performance behaviour of the AUT. Further, for all load conditions for which the measured performance is below the pre-defined performance threshold, the AUT is tuned to match the performance with the performance threshold. Tuning the AUT includes determining an optimal configuration for the one or more of the plurality of load conditions.

In yet another aspect, a non-transitory computer readable medium is provided. The non-transitory computer readable medium includes a plurality of instructions, which when executed, cause the following actions. The non-transitory computer readable medium when used for tuning and benchmarking an Application Under Test (AUT), initially determines a context of the AUT by processing an input data collected for the AUT, via one or more hardware processors. Further, a plurality of test scripts are generated for the AUT, based on the determined context, via the one or more hardware processors, wherein the plurality of test scripts are used to test performance of the AUT under a plurality of load conditions. Further, a workload is generated based on each of the plurality of test scripts, for each of the plurality of load conditions, via the one or more hardware processors. Further, the generated workload for each of the plurality of load conditions is applied on the AUT, via the one or more hardware processors. Further, it is determined if a measured performance of the AUT after applying the generated workload of each of the plurality of load conditions is matching a pre-defined performance threshold, via the one or more hardware processors, wherein the performance of the AUT is measured based on collected data representing performance behaviour of the AUT. Further, for all load conditions for which the measured performance is below the pre-defined performance threshold, the AUT is tuned to match the performance with the performance threshold, via the one or more hardware processors. Tuning the AUT includes determining an optimal configuration for the one or more of the plurality of load conditions.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 7, where similar reference characters denote corresponding features consistently throughout the figures, there are shown preferred embodiments and these embodiments are described in the context of the following exemplary system and/or method.

Figure 1:
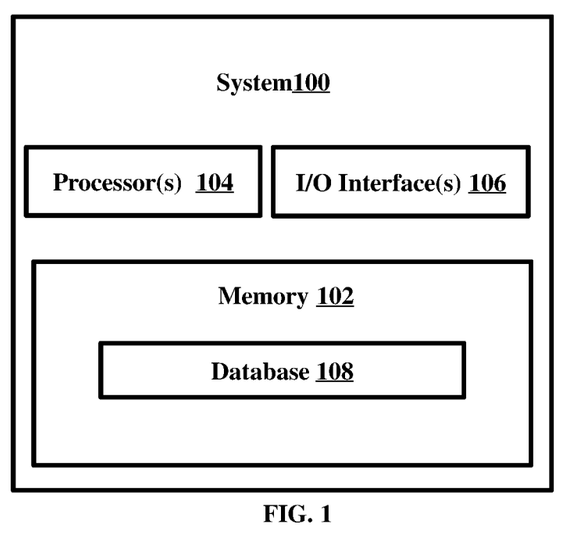
FIG. 1 illustrates an exemplary system for performance tuning and benchmarking of applications, according to some embodiments of the present disclosure.

FIG. 1 illustrates an exemplary system for performance tuning and benchmarking of applications, according to some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Further, the memory 102 includes a database 108 that stores all data associated with the application performance tuning and benchmarking being performed by the system 100. In an embodiment, as the performance tuning and benchmarking For example, the database 108 stores the configurable instructions that are executed to cause the one or more hardware processors 104 to perform various steps associated with the application performance tuning and benchmarking. The database 108 may further store all data that is collected as input for determining the performance of an Application Under Test (AUT). The database 108 may further store information on the determined performance of the AUT, and information on corresponding tuning (and values of associated parameters) performed to improve performance of the AUT. The database 108 may further store values of different thresholds that are used by the system 100 during the application performance tuning and benchmarking. Functions of the components of the system 100 are explained in conjunction with the flow diagrams in FIG. 2 and FIG. 3.

Figure 2:
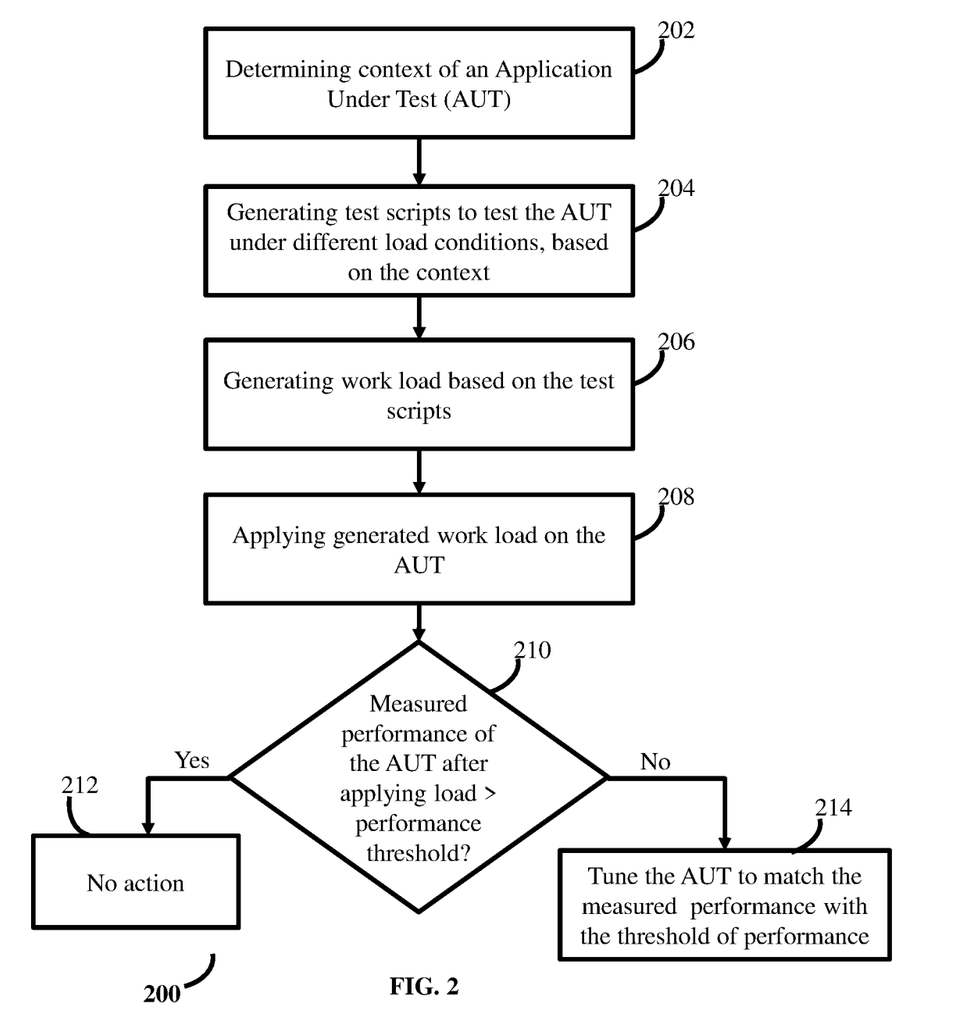
FIG. 2 is a flow diagram depicting steps involved in the performance tuning and monitoring being performed by the system of FIG. 1, according to some embodiments of the present disclosure.

FIG. 2 is a flow diagram depicting steps involved in the performance tuning and benchmarking being performed by the system of FIG. 1, according to some embodiments of the present disclosure. To monitor an application (alternately referred to as Application Under Test or AUT), the system 100 establishes connection with the AUT via one or more appropriate communication channels provided by the I/O interface 106.

Figure 4:
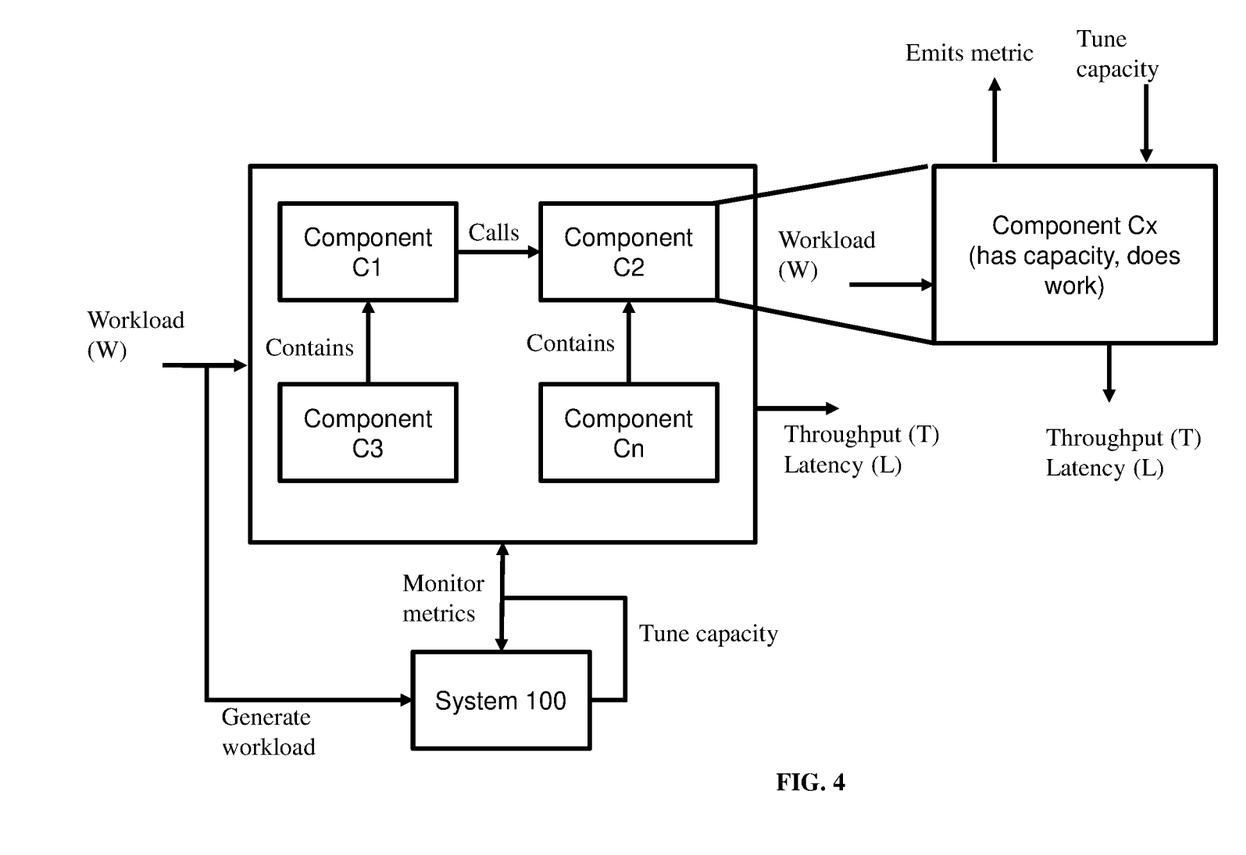
FIG. 4 is an example architecture of an Application Under Test (AUT), in accordance with some embodiments of the present disclosure.

An example structure of the AUT is depicted in FIG. 4. As in FIG. 4, the AUT has different components, wherein each component may be a combination of software and hardware components. Each of the components handles a particular work/job/responsibility, and has a particular capacity in terms of amount of work that can be handled by the component. The components of the AUT may be communicating each other for data and/or control transfer as part of handling the workload that is given as input to the AUT. The components together process the workload and generate the corresponding results, with specific throughput and latency. If any of the components is underperforming, overall performance and throughput of the AUT is adversely affected. As a result, the performance tuning and benchmarking being performed by the system 100 involves performance assessment at individual component level as well as at the overall system level. FIG. 4 also depicts how the system 100 can be connected to the AUT to perform the performance tuning and benchmarking.

At step 202, the system 100 collects data on various parameters associated with the AUT, via one or more channels provided by the I/O interface(s) 106 that connect the system 100 with the AUT, and then processes the collected data to identify a context of the AUT. The input data may be an image and/or text-based data sources such as architecture diagrams, deployment BOMs and so on, collected for the AUT.

The term 'context' may refer to various information on structure and working of the AUT, which may be arranged to a plurality of data models as listed below:

a) Factual Model—The factual model includes understanding of technologies, systems, logical components, and so on of the AUT. The systems/logical components may be one or more servers, virtual machine, network device, databases, application servers, containers, application modules, applications and so on.

b) Situational Model—The situational model includes data of specific instances of each of the factual model elements. For e.g., given a specific 3-tier application, it may have an application module deployed on a specific tomcat server which itself is installed on a specific Virtual Machine (VM). This application module may connect to a database created on a MySQL database instances installed on another VM. There could be a UI component that is deployed on an HTTP web server on a third VM. If this application is deployed in a High-Availability mode, there would be multiple instances of all these components front-ended by a load balancer. These specific details for a specific application including their attributes such as IP addresses, application names, database names etc. are stored in the situational model. Additionally, transaction call graphs for various transaction types are also stored as part of the situational model.

c) Action Model—The action model includes information on various actions that can be performed on the factual model elements e.g. increase the RAM, increase the cores, adjust the thread pool, adjust the heap memory, restart the services.

d) Workload Model—The workload model includes information on workload and performance requirements such as number of concurrent users, types of transactions and their loads, transaction mix, data volumes for test, expected throughput, expected latencies, threshold definitions and so on, with respect to the AUT.

e) Transaction model—The transaction model contains the flow and inter-relationships across constituent components of the AUT to perform a plurality of business transactions.

Various information in the factual model, the situational model, the action model, the workload model, and the transaction model together represent application topology and workload behavior of the AUT, which together represents a system reference model of the AUT. The system 100 may use the system reference model as input for determining the context of the AUT. To determine the context of the AUT from the system reference model, the system 100 extracts a component architecture, a technology architecture, a service architecture, a deployment architecture, a resource capacity architecture, a transaction flow, performance metrics list, tuneable controls list, and workload transaction specifications of the AUT, from the input data. These artefacts are explained below:

i. Component architecture—Defines the components of the AUT for e.g. a software system may contain web servers, messaging servers, application servers, database servers, application Binaries etc. This is extracted from the factual model.

ii. Technology architecture—Defines the specific technologies used in the AUT for e.g. Apache HTTP Server may be used for the web server, RabbitMQ may be used for messaging, Weblogic or Websphere may be used for application servers, Oracle may be used for database servers, etc. This is extracted from the factual model.

iii. Service architecture—All application components may be composed of a bunch of services and may expose a corresponding set of service interfaces for e.g. a banking application may expose services to view account balance, deposit funds, withdraw funds, transfer funds etc. This is extracted from the factual model.

iv. Deployment architecture—Defines the specific layout of deployment for the AUT in terms of which component is deployed on which technology and which underlying server resource, how many instances of each component are deployed, and how is the connectivity between various components enabled. This is derived from the situational model.

v. Resource capacity architecture—For every component and sub-component in the AUT, the resource capacity architecture defines the resource capacity configured for e.g. for servers this is number of cores, RAM, disk space; for databases this is number of connections, database memory etc.; for application servers this is thread pool size, connection pool size, memory etc. This is extracted from the situational model.

vi. Transaction flow—For each business transaction included as part of the workload for test, the transaction flow defines the flow across all components of the AUT. For e.g. a transaction to view account balance may start from the browser and go to the HTTP Server, from here a call may go to a session validation service to validate the user session, then go to the Account service deployed on Weblogic Server and from there go to the Accounts database deployed on the Oracle database. This is derived from the transaction model.

vii. Performance metrics list—Defines all the metrics to be measured across all the components e.g. visit count to a component, service time inside the component, throughput, response time of a component, resource capacity utilized in a component etc. This is derived from the factual model.

viii. Tuneable controls list—This defines all the aspects of the AUT that can be tuned and the action that can be taken to tune them. For e.g. the heap memory configuration of application server can be adjusted with command A, the number of connections of database can be adjusted with command B etc. This is derived from the action model.

ix. Workload transaction specifications—Defines the targets for the AUT in terms of performance requirements under a certain workload. This definition consists of:

Volume of different types of transactions e.g. $N1T1+N2T2+NnTn$ where "N" defines the number of users or units of a transaction 'T'.

Expected performance results in terms of response times for the different transactions T1, T2, Tn under the given workload condition Expected resource utilization in terms of % CPU, % memory, % IO of the various components under the given workload condition The model inputs may be provided in multiple forms such as but not limited to:

Structured specification in defined format—The specification is parsed by the system 100 to extract the relevant information. Examples of this includes XML specification for component architecture, transaction flow logs from the system, transaction flow specifications like BPMN, service interface definition files etc.

Diagrams or images—The system 100 may interpret the diagram using image recognition and OCR technologies to extract the relevant information. Examples of this may include architecture diagrams, transaction flow process diagrams etc.

Natural language explanation—The system may use suitable NLP techniques to extract the relevant information. Examples of this may include documentation of technologies, functional and technical documentation of AUT etc.

The extracted values of the various parameters together represent the context of the AUT.

Further, at step 204, the system 100 generates a plurality of test scripts to test the AUT under different load conditions. The system 100 generates the test scripts based on the technology architecture and the workload transactions specifications from the context of the AUT. The system 100 then creates the plurality of test scripts such that the test scripts correspond to the plurality of workload specifications. To generate and parameterize the test scripts, the one or more hardware processors 104 may form a workload designer consisting of record, replay and scripting interfaces. The system 100 may version control and store the scripts in a repository in the database 108. The test scripts may have scripts and runtime parameters (for with all intended load variations and load conditions) to perform the load tests on the AUT. The system 100 may provide suitable interfaces for an authorized user to define different workload scenarios that need to be characterized in the system behavior.

Figure 6:
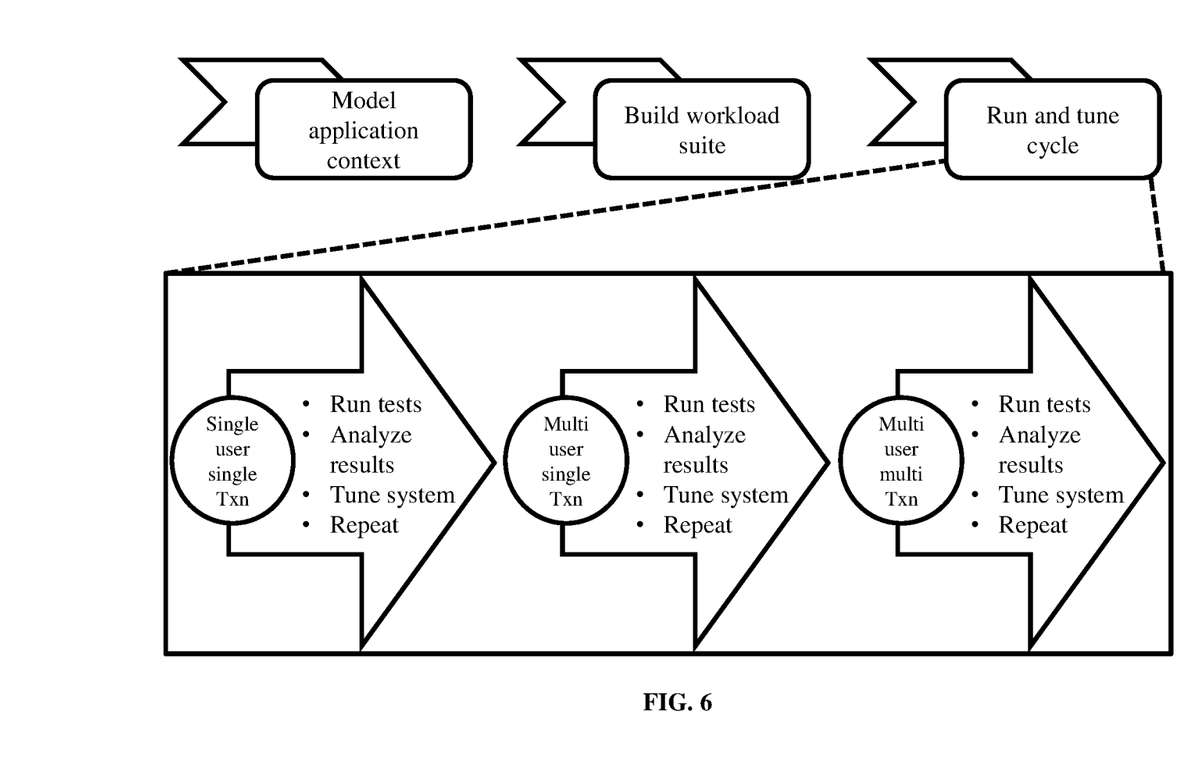
FIG. 6 depicts flow of actions in the tuning of the AUT in different contexts, in accordance with some embodiments of the present disclosure.
Figure 7:
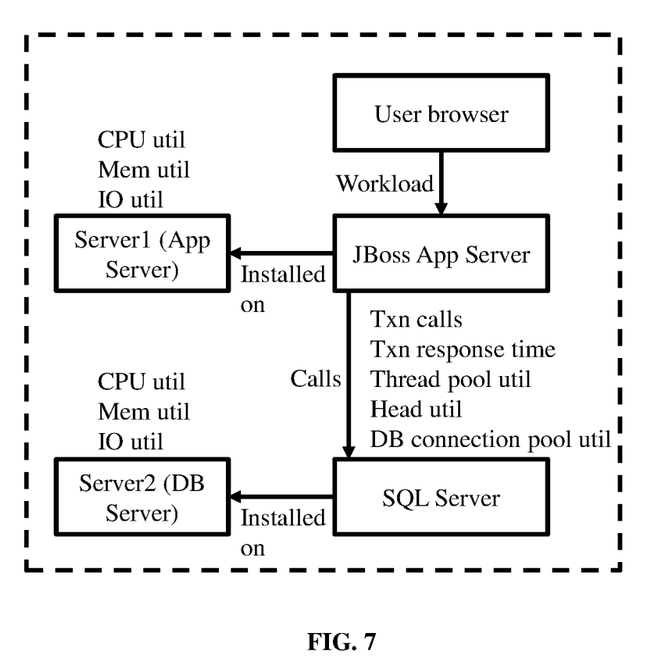
FIG. 7 depicts an example of the AUT, in accordance with some embodiments of the present disclosure.

Further, at step 206, the system 100 generates workload for the different workload specifications, based on the corresponding test scripts. The workload is generated based on workload specifications in the generated plurality of test scripts. The workload specifications include a single user single transaction workload for each transaction defined in the context, a plurality of scaling sets of multiple concurrent users for a single transaction workload for each transaction defined in the context, a plurality of combinations of transactions for a single user, and a plurality of combinations of transactions for multiple users. The different workload conditions (i.e. Single user—single transaction, multiple users—single transaction, and multiple users-multiple transactions) are depicted in FIG. 6. The system 100 may use any suitable technique to generate the workload, for any given workload specification. If AUT provides an API interface, then a workload generator of the system 100 takes a programmatic approach to call the given API using the specifications of the API. If AUT provides a screen-based interface, the workload generator takes a UI based approach to invoke the screens and navigate across the various transactions of the AUT. If AUT is a bulk processing system, the workload generator generates a suitable bulk volume of data based on the workload specifications and invokes the workload on AUT.

Further, at step 208, the system 100 applies the workload generated at step 206, on the AUT. As the workloads are generated for different workload specifications, applying the generated workloads on the AUT involves subjecting the AUT to different workloads, so that performance of the AUT under the different workload conditions can be monitored and assessed.

The system monitors performance of the AUT while applying the workload of each workload configuration, and collects data representing performance behaviour of the AUT while applying the load. The collected data representing the performance behaviour of the AUT includes a first metrics data, a second metrics data, and data on relationship between metrics of each of the individual hardware and software component of the AUT. The first metrics data correspond to resource utilization, workload throughput, transaction latency, and service demand at AUT system level. The second metrics data correspond to resource utilization, workload throughput, transaction latency, and service visits for each individual hardware and software component of the AUT (i.e. at individual component level). The system 100 then measures performance of the AUT (referred to as 'measured performance') when the load is applied, based on the collected data representing the performance behaviour of the AUT. The system 100 then determines, at step 210, if the measured performance of the AUT after applying the generated workload of each of the plurality of load conditions is equal to or exceeding a pre-defined performance threshold. If the measured performance of the AUT is at least matching the performance threshold, the system 100 may interpret that the performance of the AUT is satisfactory and does not require any tuning for performance improvement (referred to as 'no action' in step 212). However, if the measured performance of the AUT is below the performance threshold, the system 100 may interpret that the AUT is underperforming and requires tuning for performance improvement. In an embodiment, the measured performance of the system 100 may match or exceed the threshold of performance for some of the plurality of load conditions. Hence the system 100 may tune the AUT only for the load conditions for which the corresponding measured performance is below the threshold of performance.

Upon determining that the AUT needs to be tuned, at step 214, the system 100 tunes the AUT to improve the measured performance of the AUT to at least match the threshold of performance, for each of the load conditions for which the measured performance is below the threshold of performance. Tuning the AUT by the system 100 involves iteratively tuning individual parameters (i.e. the parameters forming the first metric and the second metric) from the data representing the performance behaviour of the AUT, to meet a corresponding threshold. Various steps involved in the process of tuning the AUT are depicted method 300 in FIG. 3 and are explained hereafter. At step 302, the system 100 analyzes a symptom of performance behaviour and determines the underlying root cause, wherein the symptom of performance behaviour represents deviation of a measured performance of the AUT from a defined target performance i.e. the threshold of performance. Further, at step 304, the system 100 identifies a set of tuneable parameters related to the determined underlying root cause based one or more defined relationship between each of a plurality of pre-defined root causes and corresponding tuneable parameters, and the information pertaining to the relationship may be stored in the database 108. Further, at step 306, the system 100 determines an optimum value of each of the tuneable parameters in the set of tuneable parameters, wherein the determined optimum values of the tuneable parameters form optimum adjustments. The system 100 may perform the tuning separately for all components/sub-components that have been identified as required to be tuned, based on service demand ($D_{max}$) each of the components/sub-components is handling at any instance, wherein the service demand represents amount of load. The system 100 may prioritize the component/sub-component for tuning based on decreasing value of $D_{max}$, and the tuning may involve optimizing visit count and service time, by increasing capacity (in terms of parameters such as but not limited to processing speed, and memory allocation) to accommodate the service demand. After performing optimization of the parameters, the system 100 may retest the AUT with the defined workload, measure performance, recalculate the service demand and perform the optimization till all the components/sub-components of the AUT are able to accommodate the service demand. In an embodiment, the system 100 dynamically performs the tuning as the service demand of the components and sub-components vary time to time.

Figure 3:
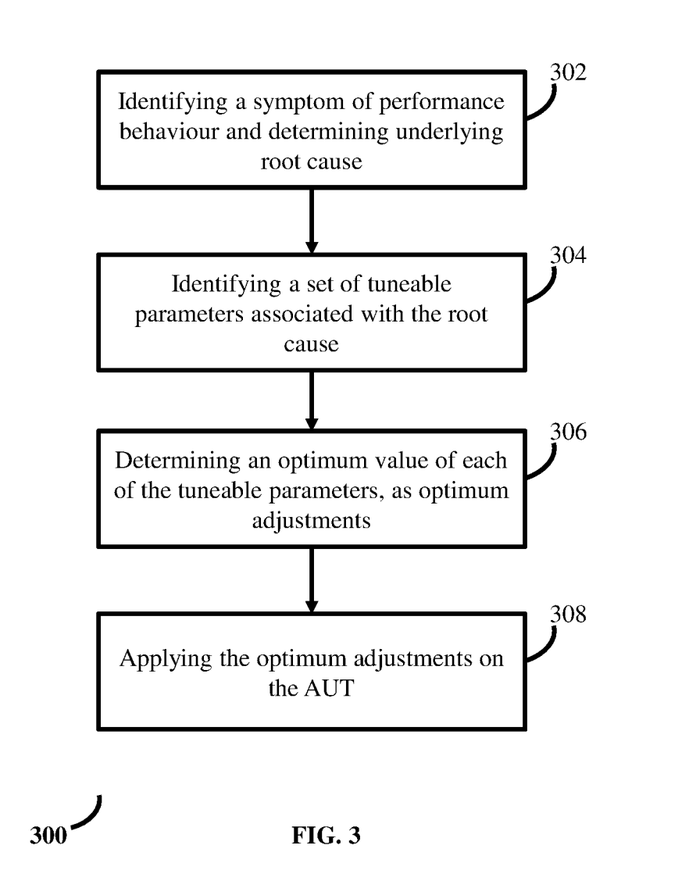
FIG. 3 is a flow diagram depicting steps involved in the process of tuning an application, using the system of FIG. 1, in accordance with some embodiments of the present disclosure.

Further, at step 308, the system 100 applies the determined optimum adjustments on the AUT, to improve the (measured) performance to at least match the target performance.

Applying the determined optimum adjustments on the AUT further involves the following steps. Initially, a total hardware and software resource requirement for the AUT is determined for a given workload, based on the determined optimum value of one or more tuneable parameters. Further, the system 100 determines an optimal configuration of the AUT and the hardware and software resources, based on a plurality of hardware and software resources matching the determined hardware and software resource requirement, for a given workload, based on the determined optimum value of the one or more tuneable parameters. The system 100 then determines a capacity and workload configurations for the plurality of hardware resources, based on the determined optimum value of the one or more tuneable parameters. The system 100 then generates the optimal configurations based on the total hardware resources requirement, a determined layout of the AUT, and the determined capacity and workload configurations. The system 100 may then recommend the determined optimal configuration to a user, via an appropriate user interface. In another embodiment, the system 100 may automatically control/modify the configurations of the AUT based on the determined optimal configuration, to improve the performance of the AUT.

In an embodiment, the system 100 may attempt the performance tuning for a defined number of iterations. If the performance of the AUT is not matching the threshold of performance even after performing the tuning for the defined number of iterations, then the system 100 may recommend a design change to the user.

Example Workflows

Following are the sequence of steps in an example use-case scenarios for the different load conditions. The example scenarios are elaborated with reference to the components of an example implementation of the system 100 as given in FIG. 5. The system 100 implementation in FIG. 5 includes a context extractor, a workload designer, a workload generator, a monitoring workbench, and a system optimizer, which are implementations of the components of system 100, and the various functions explained as part of the application performance tuning and benchmarking are distributed among the aforementioned components. Working of the system 100 under various scenarios are explained below. To understand the process better, consider the example AUT depicted in FIG. 7.

Figure 5:
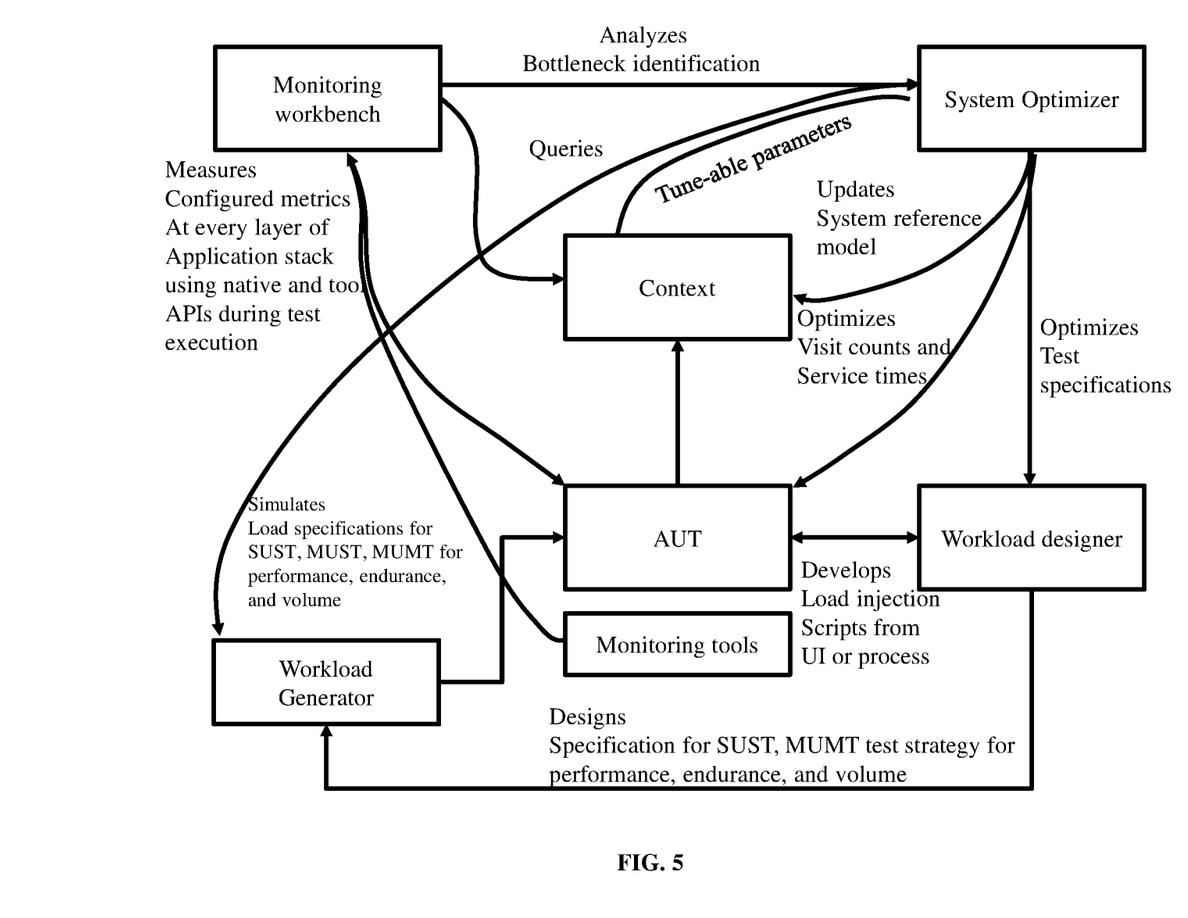
FIG. 5 depicts data and control flow between different components in an example implementation of the system of FIG. 1, in accordance with some embodiments of the present disclosure.

Scenario 1: The detailed steps for Single User Single Transaction (SUST) are as follows
1. Prerequisites:
   a. Application/Transaction context uploaded/derived
      i. Application context
      ii. Call graph
      iii. Tunable—metrics and tuning logic
2. In Workload Designer
   a. Develop/Upload test scripts
   b. Define input data
3. System 100 initiates test through Workload Generator (WG)
4. WG initiates metrics collection (OS resource usage, service time, App server JVM usage, SQL server active connections etc.) through Monitoring Workbench (MW) and passes on to System Optimizer (SO)
5. WG collects response time for defined transactions and sends to SO
6. SO compares values with thresholds:
   a. Transaction response time (latency)
   b. Resource usage
7. SO computes demand (service time*visit count) for each component and sub-component of the AUT. Visit count to be derived from call graph in context. SO determines the component that shows the highest demand, as bottleneck component. SO then determines a bottleneck sub-component inside the bottleneck component based on which sub-component shows the highest demand. This approach is followed recursively till the lowest layer of sub-components is reached.
8. SO determines the specific tunable parameters associated with the sub-component showing highest service demand. These tunable parameters could be increasing the resource capacity of the sub-component or increasing the number of sub-component instances. If the tuning of these tunable parameters requires recursive tuning for containing components, go across the hierarchy and tune the same.
9. Tuning identified components/sub-components using the process described at step 306.
10. Initiate re-run and repeat
11. Repeat till number of reruns limits/performance achieved
12. Report (update test project) with performance, capacity, and workload characteristics
13. In case no tunable and latency/resource usage>threshold, report (update test project) with key areas of contention for further design review and improvement.

Report includes:
1. Run summary
2. Response time/latency
3. Demand in descending order (Top n)
4. Tuning details
5. Computed system requirement and behavior for given MUST profile Scenario 2: Multi User Single Transaction (MUST) Details
1. Prerequisites:
   i. Single User Single Transaction (SUST) passed
   ii. Input (vale of "multiple user" defined)
2. Initiates test through the Workload generator (WG). Based on SUST results, system 100 determines the appropriate volume of concurrent users for running this test.

3. WG initiates metrics collection (OS resource usage, service time, App server JVM usage, SQL server active connections etc.) through the Monitoring Workbench (MW) and passes on to the System Optimizer (SO)
4. WG collects response time for defined transactions and sends to SO
5. SO compares values with thresholds:
   a. Transaction response time (latency)
   b. Resource usage
6. SO computes demand (service time*visit count) for each component and sub-component of the AUT. Visit count to be derived from call graph in context. SO determines the bottleneck component based on which component shows the highest demand. SO then determines the bottleneck sub-component inside this component based on which sub-component shows the highest demand. This approach is followed recursively till the lowest layer of sub-components is reached.
7. SO determines the specific tunable associated with the sub-component showing highest service demand. This tunable could be increasing the resource capacity of the sub-component or increasing the number of sub-component instances. If this tunable requires recursive tuning for containing components, go across the hierarchy and tune the same.
8. Initiate rerun and repeat
9. Repeat till number of reruns limits/performance achieved
10. Calculates capacity requirement for application (Σ(Individual txn usage−No load usage)*txn concurrency ratio (full load/MUST workload)), advice if capacity forecast is higher than SLA
11. Report (update test project) with performance, capacity, and workload characteristics
12. In case no tunable and latency/resource usage>threshold, report (update test project) with key areas of contention for further design review and improvement.
Report includes:
1. Run summary
2. Response time/latency
3. Demand in descending order (Top n)
4. Capacity Forecast for given MUST profile
5. Tuning details Scenario 3: The Detailed Steps for Multi User Multi Transaction (MUMT)
1. Prerequisites:
   i. MUST passed
   ii. Input (vale of "multiple transaction" defined)
2. Initiates test through Workload generator (WG). Based on the SUST and MUST results, the system 100 computes the appropriate concurrent user workload for the MUMT tests.
3. WG initiates metrics collection (OS resource usage, service time, App server JVM usage, SQL server active connections etc.) through Monitoring Workbench (MW) and passes on to System Optimizer (SO)
4. WG collects response time for defined transactions and sends to SO
5. SO compares values with thresholds:
   a. Transaction response time (latency)
   b. Resource usage
6. SO computes demand (service time*visit count) for each component and sub-component of the AUT. Visit count to be derived from call graph in context. SO determines the bottleneck component based on which component shows the highest demand. SO then determines the bottleneck sub-component inside this component based on which sub-component shows the highest demand. This approach is followed recursively till the lowest layer of sub-components is reached.
7. SO determines the specific tunable associated with the sub-component showing highest service demand. This tunable could be increasing the resource capacity of the sub-component or increasing the number of sub-component instances. If this tunable requires recursive tuning for containing components, go across the hierarchy and tune the same.
8. Initiate rerun and repeat
9. Repeat till number of reruns limits/performance achieved
10. Report (update test project) with performance, capacity, and workload characteristics
11. In case no tunable and latency/resource usage>threshold, report (update test project) with key areas of contention for further design review and improvement.
Report includes:
1. Run summary
2. Response time/latency
3. Demand in descending order (Top n)
4. Capacity usage
5. Tuning details
6. Application performance benchmark including scaling characteristics The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein address unresolved problem of application performance management. The embodiment, thus provides a mechanism to measure performance of an Application Under Test (AUT), for varying load conditions. Moreover, the embodiments herein further provide a mechanism of tuning the AUT if a measured performance is below a threshold of performance, for any load configuration.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
    determining a context of an application under test (AUT) by processing an input data collected for the AUT, via one or more hardware processors;
    generating a plurality of test scripts for the AUT, based on the determined context, via the one or more hardware processors, wherein the plurality of test scripts are used to test performance of the AUT under a plurality of load conditions, wherein the plurality of load conditions corresponds to a single user-single transaction, multiple users-single transaction, and multiple users-multiple transactions;
    generating a workload based on each of the plurality of test scripts, for each of the plurality of load conditions, via the one or more hardware processors;
    applying the generated workload for each of the plurality of load conditions on the AUT, via the one or more hardware processors;
    determining if a measured performance of the AUT after applying the generated workload of each of the plurality of load conditions is matching a pre-defined performance threshold, via the one or more hardware processors, wherein the performance of the AUT is measured based on a plurality of collected data representing performance behaviour of the AUT;
    dynamically performing tuning the AUT to match performance of the AUT to the performance threshold, for one or more of the plurality of load conditions for which the measured performance is below the pre-defined performance threshold as a service demand ($D_{max}$) of components and sub-components vary time to time, via the one or more hardware processors, wherein tuning the AUT comprises determining an optimal configuration for the one or more of the plurality of load conditions, wherein the dynamically performing tuning the AUT comprises:
        iteratively tuning individual parameters from the parameters forming the first metrics data and the second metrics data that in combination represent the performance of the AUT,
    wherein performance of the AUT comprises:
        analyzing a symptom of performance behaviour and determining an underlying root cause, wherein the symptom of performance behaviour represents deviation of a measured performance of the AUT from a defined target performance;
        identifying a set of tunable parameters related to the determined underlying root cause based one or more defined relationship between each of a plurality of pre-defined root causes and corresponding tunable parameters, wherein the set of tunable parameters are associated with a component or sub-component depicting a highest service demand and the set of tunable parameters tend to increase a resource capacity of the sub-component or tend to increase a number of sub-component instances,
        wherein when tuning of the set of tunable parameters requires recursive tuning for the components, then process includes tuning the set of tunable parameters again;
        recommending a design choice when a measured performance of the AUT is deviating from the defined target performance, after tuning of the set of tunable parameters for a pre-defined number of iterations;
        determining an optimum value of each of tuneable parameter in a set of tuneable parameters, wherein the determined optimum value of the tuneable parameter forms optimum adjustments;
        performing tuning separately for the components/sub-components being identified as required to be tuned, based on the service demand ($D_{max}$) of each of the components/sub-components, wherein the service demand ($D_{max}$) represents amount of load;
        prioritizing the components/sub-components for tuning in accordance with a decreasing value of the $D_{max}$, and the tuning involves optimizing a visit count and a service time, by increasing capacity in terms of processing speed, and a memory allocation to accommodate the $D_{max}$;

applying the determined the optimum adjustments on the AUT; and retesting the AUT with the defined workload, measuring performance, recalculating the $D_{max}$ and perform the optimization till all the components/sub-components of the AUT are able to accommodate the $D_{max}$.

2. The method of claim 1, the context of the AUT is determined based on the input data further comprising one or more of, a) a factual model representing information on a plurality of hardware and software components of the AUT, including the ability to understand each component as a further breakdown of constituent components as required, b) a situational model containing data with respect to a plurality of instances of each of the plurality of the hardware and software components of the AUT, c) an action model containing information on a plurality of actions that are executed on each of the plurality of the hardware and software components covered in the factual model, d) a workload model containing information on workload and performance requirements with respect to each of the plurality of the hardware and software components of the AUT, and e) a transaction model containing the flow and inter-relationships across constituent components of AUT to perform a plurality of business transactions.

3. The method of claim 2, wherein determining the context of the AUT comprises:

extracting a component architecture, a technology architecture, a service architecture, a deployment architecture, a resource capacity architecture, a transaction flow, performance metrics, tuneable controls, and workload transaction specifications of the AUT, from the input data; and determining the context, based on values of a plurality of parameters associated with the component architecture, the technology architecture, the service architecture, the deployment architecture, the resource capacity architecture, the transaction flow, the performance metrics, the tuneable controls, and the workload transaction specifications.

4. The method of claim 1, wherein generating the plurality of test scripts for the AUT comprises:

determining from the context of the AUT, the technology architecture of the AUT and the workload transactions specifications; and creating the plurality of test scripts matching the determined context of the AUT, wherein the plurality of test scripts correspond to the plurality of workload specifications.

5. The method of claim 1, wherein the workload is generated and applied based on workload specifications in the generated plurality of test scripts, wherein the workload specifications further comprising:

a single user single transaction workload for each transaction defined in the context;

a plurality of scaling sets of multiple concurrent users for a single transaction workload for each transaction defined in the context;

a plurality of combinations of transactions for a single user; and a plurality of combinations of transactions for multiple users.

6. The method of claim 1, wherein the plurality of collected data representing performance behaviour of the AUT comprises:

a first metrics data for resource utilization, workload throughput, transaction latency, and service demand at AUT system level;

a second metrics data for resource utilization, workload throughput, transaction latency, and service visits for each individual hardware and software component of the AUT; and data on relationship between metrics of each of the individual hardware and software component of the AUT.

7. The method of claim 1, wherein applying the determined optimum adjustments comprises:

determining a total hardware and software resource requirement for the AUT for a given workload, based on the determined optimum value of one or more tuneable parameters;

determining an optimal configuration of the AUT and the hardware and software resources, based on a plurality of hardware and software resources matching the determined hardware and software resource requirement, for a given workload, based on the determined optimum value of the one or more tuneable parameters;

determining capacity and workload configurations for the plurality of hardware resources, based on the determined optimum value of the one or more tuneable parameters; and generating the optimal configurations based on the total hardware resources requirement, determining a layout of the AUT, and the determined capacity and workload configurations.

8. The method of claim 7, wherein the optimal configuration determined for the one or more of the plurality of load conditions is recommended to a user, via the one or more hardware processors.

9. A system, comprising:

one or more hardware processors;

an I/O interface; and a memory storing a plurality of instructions, wherein the plurality of instructions when executed, cause the one or more hardware processors to:

determine a context of an application under test (AUT) by processing an input data collected for the AUT;

generate a plurality of test scripts for the AUT, based on the determined context, wherein the plurality of test scripts are used to test performance of the AUT under a plurality of load conditions, wherein the plurality of load conditions corresponds to a single user-single transaction, multiple users-single transaction, and multiple users-multiple transactions;

generate a workload based on each of the plurality of test scripts, for each of the plurality of load conditions;

apply the generated workload for each of the plurality of load conditions on the AUT;

determine if a measured performance of the AUT after applying the generated workload of each of the plurality of load conditions is matching a pre-defined performance threshold, wherein the performance of the AUT is measured based on a plurality of collected data representing performance behaviour of the AUT; and dynamically perform tune the AUT to match performance of the AUT to the performance threshold, for one or more of the plurality of load conditions for which the measured performance is below the pre-defined performance threshold as a service demand ($D_{max}$) of components and sub-components vary time to time, wherein tuning the AUT comprises determining an optimal configuration for the one or more of the plurality of load conditions, wherein the dynamically performing tuning the AUT comprises:
   iteratively tuning individual parameters from the parameters forming the first metrics data and the second metrics data that in combination represent the performance of the AUT, wherein performance of the AUT comprises:
   analyzing a symptom of performance behaviour and determining an underlying root cause, wherein the symptom of performance behaviour represents deviation of a measured performance of the AUT from a defined target performance;
   identifying a set of tunable parameters related to the determined underlying root cause based one or more defined relationship between each of a plurality of pre-defined root causes and corresponding tunable parameters, wherein the set of tunable parameters are associated with a component or sub-component depicting a highest service demand and the set of tunable parameters tend to increase a resource capacity of the sub-component or tend to increase a number of sub-component instances,
      wherein when tuning of the set of tunable parameters requires recursive tuning for the component, then process includes tuning the set of tunable parameters again;
   recommend a design choice when a measured performance of the AUT is deviating from the defined target performance, after tuning of the set of tunable parameters for a pre-defined number of iterations;
   determine an optimum value of each of tuneable parameter in a set of tuneable parameters, wherein the determined optimum value of the tuneable parameter forms optimum adjustments;
   performe tuning separately for the components/sub-components being identified as required to be tuned, based on the service demand ($D_{max}$) of each of the component/sub-component, wherein the service demand ($D_{max}$) represents amount of load;
   prioritize the components/sub-components for tuning in accordance with a decreasing value of the $D_{max}$, and the tuning involves optimizing a visit count and a service time, by increasing capacity in terms of processing speed, and a memory allocation to accommodate the $D_{max}$;
   applying the determined the optimum adjustments on the AUT; and
   retest the AUT with the defined workload, measuring performance, recalculating the $D_{max}$ and perform the optimization till all the components/sub-components of the AUT are able to accommodate the $D_{max}$.

10. The system as claimed in claim 9, wherein the system determines the context of the AUT based on the input data comprising one or more of,
   f) a factual model representing information on a plurality of hardware and software components of the AUT, including the ability to understand each component as a further breakdown of constituent components as required,
   g) a situational model containing data with respect to a plurality of instances of each of the plurality of the hardware and software components of the AUT,
   h) an action model containing information on a plurality of actions that are executed on each of the plurality of the hardware and software components covered in the factual model,
   i) a workload model containing information on workload and performance requirements with respect to each of the plurality of the hardware and software components of the AUT, and
   j) a transaction model containing the flow and inter-relationships across constituent components of AUT to perform a plurality of business transactions.

11. The system as claimed in claim 10, wherein the system determines the context of the AUT by:
   extracting a component architecture, a technology architecture, a service architecture, a deployment architecture, a resource capacity architecture, a transaction flow, performance metrics, tuneable controls, and workload transaction specifications of the AUT, from the input data; and
   determining the context, based on values of a plurality of parameters associated with the component architecture, the technology architecture, the service architecture, the deployment architecture, the resource capacity architecture, the transaction flow, the performance metrics, the tuneable controls, and the workload transaction specifications.

12. The system as claimed in claim 9, wherein the system generates the plurality of test scripts for the AUT by:
   determining from the context of the AUT, the technology architecture of the AUT and the workload transactions specifications; and
   creating the plurality of test scripts matching the determined context of the AUT, wherein the plurality of test scripts correspond to the plurality of workload specifications.

13. The system as claimed in claim 9, wherein the system generates and applies the workload based on workload specifications in the generated plurality of test scripts, wherein the workload specifications comprising:
   a single user single transaction workload for each transaction defined in the context;
   a plurality of scaling sets of multiple concurrent users for a single transaction workload for each transaction defined in the context;
   a plurality of combinations of transactions for a single user; and
   a plurality of combinations of transactions for multiple users.

14. The system as claimed in claim 9, wherein the plurality of collected data representing performance behaviour of the AUT comprises:
   a first metrics data for resource utilization, workload throughput, transaction latency, and service demand at AUT system level;
   a second metrics data for resource utilization, workload throughput, transaction latency, and service visits for each individual hardware and software component of the AUT; and
   data on relationship between metrics of each of the individual hardware and software component of the AUT.

15. The system as claimed in claim 9, wherein the system applies the determined optimum adjustments by:
   determining a total hardware and software resource requirement for the AUT for a given workload, based on the determined optimum value of one or more tuneable parameters;
   determining an optimal configuration of the AUT and the hardware and software resources, based on a plurality of hardware and software resources matching the determined hardware and software resource requirement, for a given workload, based on the determined optimum value of the one or more tuneable parameters;
   determining capacity and workload configurations for the plurality of hardware resources, based on the determined optimum value of the one or more tuneable parameters; and
   generating the optimal configurations based on the total hardware resources requirement, determining a layout of the AUT, and the determined capacity and workload configurations, wherein the optimal configurations determined for the one or more of the plurality of load conditions are recommended to a user.

16. One or more non-transitory machine-readable information storage mediums comprising one or more instructions which when executed by one or more hardware processors cause:
   determining a context of an application under test (AUT) by processing an input data collected for the AUT, via one or more hardware processors;
   generating a plurality of test scripts for the AUT, based on the determined context, via the one or more hardware processors, wherein the plurality of test scripts are used to test performance of the AUT under a plurality of load conditions, wherein the plurality of load conditions corresponds to a single user-single transaction, multiple users-single transaction, and multiple users-multiple transactions;
   generating a workload based on each of the plurality of test scripts, for each of the plurality of load conditions, via the one or more hardware processors;
   applying the generated workload for each of the plurality of load conditions on the AUT, via the one or more hardware processors;
   determining if a measured performance of the AUT after applying the generated workload of each of the plurality of load conditions is matching a pre-defined performance threshold, via the one or more hardware processors, wherein the performance of the AUT is measured based on a plurality of collected data representing performance behaviour of the AUT;
   dynamically performing tuning the AUT to match performance of the AUT to the performance threshold, for one or more of the plurality of load conditions for which the measured performance is below the pre-defined performance threshold as a service demand ($D_{max}$) of the components and sub-components vary time to time, via the one or more hardware processors, wherein tuning the AUT comprises determining an optimal configuration for the one or more of the plurality of load conditions, wherein the dynamically performing tuning the AUT comprises:
   iteratively tuning individual parameters from the parameters forming the first metrics data and the second metrics data that in combination represent the performance of the AUT, wherein performance of the AUT comprises:
   analyzing a symptom of performance behaviour and determining an underlying root cause, wherein the symptom of performance behaviour represents deviation of a measured performance of the AUT from a defined target performance;
   identifying a set of tunable parameters related to the determined underlying root cause based one or more defined relationship between each of a plurality of pre-defined root causes and corresponding tunable parameters, wherein the set of tunable parameters are associated with a component or sub-component depicting a highest service demand and the set of tunable parameters tend to increase a resource capacity of the sub-component or tend to increase a number of sub-component instances,
   wherein when tuning of the set of tunable parameters requires recursive tuning for the components, then process includes tuning the set of tunable parameters again;
   recommending a design choice when a measured performance of the AUT is deviating from the defined target performance, after tuning of the set of tunable parameters for a pre-defined number of iterations
   determining an optimum value of each of the tuneable parameters in a set of the tuneable parameters, wherein the determined optimum value of the tuneable parameter forms optimum adjustments;
   performing tuning separately for the components/sub-components being identified as required to be tuned, based on the service demand ($D_{max}$) of each of the components/sub-components, wherein the service demand ($D_{max}$) represents amount of load,
   prioritizing the components/sub-components for tuning in accordance with a decreasing value of $D_{max}$, and the tuning involves optimizing a visit count and a service time, by increasing capacity in terms of processing speed, and a memory allocation to accommodate the $D_{max}$;
   applying the determined the optimum adjustments on the AUT; and
   retesting the AUT with the defined workload, measuring performance, recalculating the $D_{max}$ and perform the optimization till all the components/sub-components of the AUT are able to accommodate the $D_{max}$.

* * * * *